Dec. 10, 1957  R. L. OLSON  2,815,548
METHOD OF AND MEANS FOR SEALING AGAINST BLOW-BY BETWEEN
THE SEPARABLE JOINT FACES OF CORE BOXES, PRESSURE
MOLDS, AND THE LIKE
Filed March 4, 1954
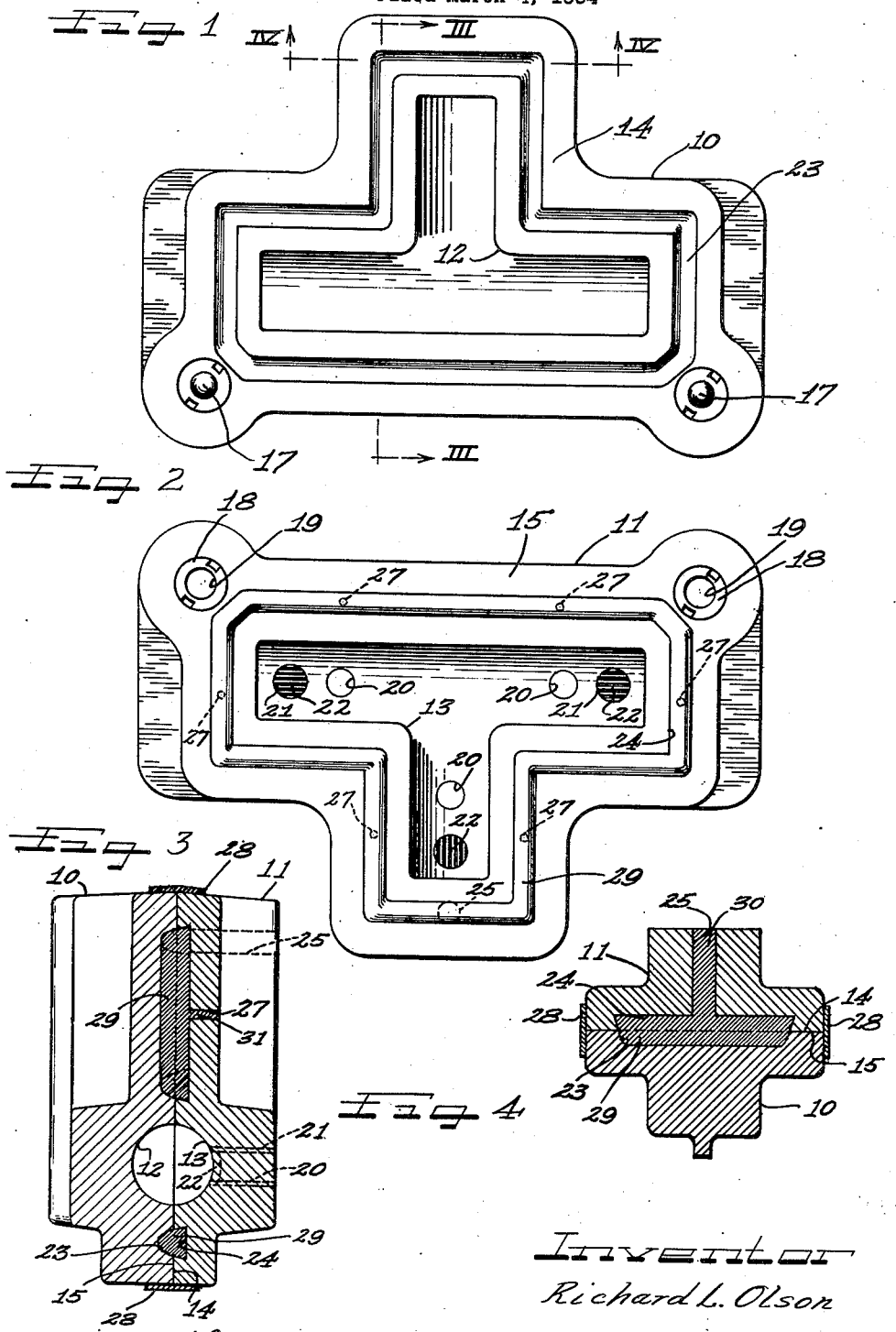
Inventor
Richard L. Olson

United States Patent Office 2,815,548
Patented Dec. 10, 1957

2,815,548

METHOD OF AND MEANS FOR SEALING AGAINST BLOW-BY BETWEEN THE SEPARABLE JOINT FACES OF CORE BOXES, PRESSURE MOLDS, AND THE LIKE

Richard L. Olson, Chicago, Ill.

Application March 4, 1954, Serial No. 414,171

5 Claims. (Cl. 22—10)

The present invention relates to a novel method of and means for preventing blow-by between separable opposed surfaces or joint faces of members providing therebetween one or more cavities or chambers within which material is to be processed under pressure, and of which blown sand core boxes, or molds, and the like are examples.

Until my present invention the problem of blow-by at the joints between sand molding boxes or molds, such as dump core boxes and the blow plates, between the mating portions of split core boxes either of the single cavity or gang type having multiple cavities, has not been satisfactorily met. It is now common practice to blow the sand for the cores into the core boxes under air pressure. Unless the opposing joint faces of the mating members about the cavity or cavities are in virtually perfect abutment entirely about the cavity area, while the sand is being forced into the cavity under air pressure, blow-by results. Abrasive erosion caused by the sand particles entrained in the air blowing through the imperfect joint causes wearing away and channeling. Eventually, so much leakage occurs that voids and soft spots appear in the formed cores. This necessitates repair of the core boxes by resurfacing the mating joint surfaces or insertion of repair plates, or similar expensive repair expedients.

Often, even though the mating joint surfaces of the core boxes may be machined to high precision, the constant beating or pressure applied thereto by the sand blowing machine causes warpage resulting in blow-by as portions of the mating joint surfaces tend to separate due to the warpage.

Attempts have heretofore been made to provide resilient sealing gaskets between the mating surfaces of the joints. In such seals, one of the mating members carries the seal which presses against the flat opposing surface of the joint face of the opposing member of the core box or mold. Such seals have been unsatisfactory for several reasons among which may be mentioned, that they require expansion room into which the seal material can displace to allow the joint surfaces of the mold members to come into abutment; such resilient seals inherently are not uniform in their sealing pressures and thus too often allow blow-by in spite of the seal; the resilient sealing material comes in strips and when installed leaves a joint at the separate ends of the strip which, if not quite expertly handled, leaves a blow-by gap or at least weakness in the seal; and such resilient seals are virtually impossible to use on contoured core boxes or molds and are thus limited in practice to use on flat faced separable mold or core box members.

It is accordingly an important object of the present invention to provide a novel method of sealing the joint interfaces of separable mold or core box components for preventing blow-by under pressure molding operations.

Another object of the invention is to provide novel sealing means for preventing blow-by between the opposing joint surfaces of cavity molds or core boxes subject to internal pressures in use.

A further object of the invention is to provide a novel method of and means for sealing core boxes or molds of any shape or contour in the mating joint surfaces thereof.

Still another object of the invention is to provide a core box or mold sealing method and means that is inexpensive and simple in execution and is adaptable to existing molds and core boxes as well as to newly constructed assemblies.

Yet another object of the invention is to provide a core box or mold seal that can be readily repaired or replaced when necessary in minimum time and without requiring any machining.

A still further object of the invention is to provide core boxes with a blow-by preventing seal that will maintain the separable components in positive alignment and will withstand the impact shocks incident to poundings of a mallet, as customarily utilized in loosening the core box components from a finished core.

Other objects, features and advantages of the present invention will be readily apparent from the following detailed description taken in conjunction with the accompanying drawings illustrating one embodiment of the invention and in which:

Figure 1 is a plan view of the inner face of one component of a split core box assembly;

Figure 2 is an inner side plan view of the mating component for the core box component of Figure 1;

Figure 3 is a transverse sectional detail view taken substantially on the line III—III of Figure 1 and assuming the assembly of the core box components of Figures 1 and 2; and Figure 4 is a sectional detail view taken substantially on the line IV—IV of Figure 1, also assuming the completed assembly of the two separable core box components.

In practicing the method of the present invention, the mold components, whether they be a sand core box, or other mold or the like within the cavity of the separable components of which substantial pressures develop in service, is fully completed and made ready for service, or it may be such a mold which has already been in service and it is desired to provide the same with a seal according to the present invention. That is, the separable components of the mold whether it be a dump core box upon which a blow plate is placed to blow a sand core therein, or a split core box having mating portions providing therebetween a sand core cavity, or a gang core box wherein multiple cavities are provided, are completely machined including the registering cavities, the mating joint surfaces, the guide pins and their sockets, the blow holes, the vent holes and screens, so that if desired, the core box or mold could be used for its intended purpose without the seal if desired. Thereby, as nearly perfect as practicable, accurate matching of the cavity in split core box or mold components is attained.

Then a groove is made in the joint face of one of the core box components continuously about the entire perimeter and spaced outwardly from the cavity in the mold component. A matching groove is provided in the joint face of the mating mold component to register with the groove in the first mentioned component upon assembly of the mold components. One of the grooves is made with a substantially smooth surface and free from surface characteristics that might cause binding or interlocking of the seal. The remaining groove, on the other hand, is deliberately provided with such a construction that the seal will interlock therewith and resist displacement therefrom. To this end, the latter groove may be undercut or of dovetail structure either continuously or at desired intervals and it may be left rough, while the opposite groove, that is the smooth groove may be finished off smoothly and may be of half-round or V-formation.

After the grooves have been completed, the mold components are placed into operative assembly with the joint faces in tight abutment and fluent seal material is poured through a pour hole in one of the mold components into the matching grooves to completely fill the grooves. During this, air may be displaced through appropriately located vent holes leading into the closed matching grooves. The sealing material is then solidified in the grooves and the mold components separated to determine the perfection of the seal which is locked into the groove having the undercuts or interlock structure and is separable with respect to the opposite groove.

It will be appreciated, of course, that both the pouring hole and the vent openings should be provided in the mold component that has the locking groove therein. The sprue both at the pouring hole and at the vent holes will assist in locking the seal in place.

I have found that an excellent material for use in the seals of blown sand core boxes is a bismuth-containing alloy of low melting point. Since these core boxes are not subjected to heat of any consequence in use, a metal alloy that will melt at approximately the boiling point of water and preferably slightly less than the boiling point of water may be used since it can be melted simply by placing it in a container in boiling water such as a double-boiler, and when the molten metal is poured it will not sputter or steam and is quite safe to handle. In order to facilitate coating the seal the core box components should be warmed to near the melting temperature of the esal alloy. After the seal has been cast, it is often advantageous to chill the mold rapidly as by dipping in water, spraying, air blasting or the like, to create a fine grain structure in the seal.

Suitable low melting alloys are available under various trade names on the market and contain various preferred percentages of bismuth, tin, lead, cadmium or indium. By preference, the alloy should have a slight expansion or growth factor or solidifying so as to assure a tight seal in the matching opposed grooves in the mold components.

By preference, also, the selected alloy should be non-adherent with respect to the material of the core box and more especially non-adherent within the smooth surface of the separable core box or mold component. In this manner, separation of the mold components can be effected without sticking of the seal in the groove within which the seal fits separably. Yet, because of the slight expansion or growth factor in the alloy, accurate molded registration of the seal in the separable groove is attained. This, taken together with the fact that the seal is locked into the other groove assures a thorough dam-like seal against blow-by between the joint faces of the mold components.

A seal that is die-cast in situ of a low melting alloy, as described, has several advantages in addition to its sealing function. Such a seal has high shock impact resistance, in a typical instance up to 10,000 pounds per square inch. In addition, the material of the seal has a recovery factor in that these low melting alloys have flow characteristics under constant pressure. Therefore, the seal can adjust itself readily for slight accidental nicks that may be formed therein in use, and it can adjust itself to slight warpages that may occur in the mold during use.

Should the seal require replacement at any time, it may simply be melted out of the interlock groove by dipping the mold component carrying the same into boiling water, and a new seal can be poured into the matching grooves.

Where, due to non-uniformity in the joint interface abutment between the mold components, there may be a tendency for the fluid seal material to escape from the groove chamber, during the seal pouring operation, to the outside of the mold, I find that the outside of the joint can be effectively sealed against such escape by applying thereto masking tape. Such tape, of course, is of the type having a self-adhering, tacky adhesive thereon and can be quickly and easily applied to the outer surface of the mold over the joint irrespective of external mold contour, and can be quickly stripped from the mold after the pouring and setting of the seal. For making a seal with a low melting point seal material, the ordinary readily commercially obtainable sealing tape is entirely satisfactory. Of course, where higher temperatures may be involved in making the seal, it may be necessary to utilize special grades of tape.

In providing seals for molds in which the temperatures involved in production service of the molds will exceed the boiling point of water, the sealing material must be selected to withstand a safe range of temperatures affording a safety factor well above the maximum temperature to which the mold may be subjected in use. For example, in the application of a seal according to the present invention to a mold assembly involving curing temperatures up to 300° F. the seal may comprise a suitable alloy having a melting point of up to 600° F. A large range of low melting point alloys is known and commercially available to accommodate various temperature requirements.

While for heavy duty use low melting point alloys serve quite advantageously, various resinous plastic or vulcanizable elastomeric materials have been developed which may be adapted for the present purpose. I therefore contemplate that the seal may, under proper circumstances, be made from thermosetting, thermoplastic, or cold setting resinous plastic or vulcanizable elastomeric materials. In any event, one of the matching grooves must have the interior surface thereof treated to afford easy release of the seal for separation of the mold components, while the opposite groove should have the seal locked therein. For example neoprene may be laid in the seal groove chamber of the mold and vulcanized or cured by baking at a controlled temperature to expand and fill the seal chamber, with a silicone separator on the releasable groove surface.

As a typical example of a mold utilizing a seal according to the present invention, reference is made to the structure shown in the drawing. Therein is shown a split core box adapted for making a generally T-shaped sand core. The core box comprises a lower member or component 10 (Figure 1) and an upper member or component 11 (Figure 2). Within the core box component 10 is a half core cavity 12 while in the upper core box component 11 is a complementary half core cavity 13.

In assembly, the core box members 10 and 11 are placed in face-to-face relation with a joint surface 14 on the member 10 about the cavity 12 abutting a joint surface 15 on the core box member 11 about the cavity 13. The opposing joint surfaces 14 and 15 are, of course, machined as accurately as practicable to fit in abutment over their entire opposing surface areas. When assembled, the core box members 10 and 11 afford registration of the core cavities 12 and 13 to provide a complete core chamber.

Since it is necessary that the core cavities 12 and 13 register as nearly as practicable accurately, it is customary to provide core boxes with guide pins. To this end, the core box assembly disclosed as exemplary herein is provided with alignment assuring means herein comprising guide pins 17 preferably mounted fixedly upon the lower core box member 10 and projecting substantially above the parting or joint face 14. For reception of the pins 17, the core box member 11 is provided with complementary means comprising hardened guide bushings 18 set into the joint face 15 and providing respective pin sockets 19.

Sand is introduced into the core cavity 12, 13 through appropriately located blow holes 20 provided in the upper core box member 11 and leading from the exterior of the member to the interior of the cavity 13. The assembled core box is placed under a blow plate of a sand blowing machine and clamped down and core sand blown under strong molding and forming air pressure through the blow holes 20 into the closed molding cavity 12, 13. Air escapes through vent holes 21 provided with suitable sand holdback grids 22.

In practice, I find it desirable to test the mold for accuracy before providing the joint seal therefor. That is, the mold or core box is completed, except for the seal and then tested by making a core or molding an article therein preferably under actual operating conditions, or at least simulated operating conditions, and any desirable alterations or adjustments then made in the mold before equipping the same with the seal. This does not necessarily mean that the grooves for the seal should not be machined in the joint faces before the mold is tested, but the seal itself is preferably not cast before the testing of the mold for accuracy.

For the joint seal, the joint face of one of the mold members, herein the joint face 14 of the core box member 10 is provided between the cavity 12 and the centering projections or pins 17 with a continuous groove 23 recessed therein and entirely surrounding the core cavity 12, preferably in uniformly spaced relation thereto. This groove is preferably the one from which the joint seal will be readily separable and should therefore be surface treated and constructed to this end. For example, as best seen in Figures 3 and 4, the groove 23 may be of rounded transverse contour so that all portions of the surface thereof face generally outwardly. This may be a V-groove or a half-round groove or some modification or combination of such shapes, as preferred. Moreover, the surface should be as smooth as practicable, although extreme or finished smoothness is ordinarily not essential.

In the joint surface 15 of the opposite or upper core box member 11, a continuous groove 24 is provided recessed entirely about the core cavity 13 and preferably uniformly spaced therefrom and as nearly as practicable matching the groove 23 of the lower core box member 10 so that in assembly they will provide a continuous groove chamber as best seen in Figures 3 and 4. By preference, either or both longitudinal sides of the groove 24 may be undercut continuously or at spaced points, herein shown as generally dove-tail undercutting, in order to assure thorough locking of the seal therein.

Leading into a convenient part of the groove 24 through the top of the core box member 11 is a sprue hole 25. At suitable intervals spaced from the sprue hole 25 and leading from the groove 24 is a series of small vent openings 27 leading to and opening through the top of the core box member 11.

When the mold is ready to be equipped with the seal, the members 10 and 11 are assembled and clamped together, and if desired, a removable sealing tape 28 is secured to the outer side thereof entirely about the joint provided between the joint faces 14 and 15. Then, either by gravity molding or casting or injection molding or casting, seal material is introduced through the sprue hole 25 to completely fill the continuous seal groove chamber 23, 24 and purge the same completely of air through the vents 27. The seal material is then caused to solidify and this provides a continuous dam-like seal 29 intersecting the joint faces 14 and 15 entirely about the mold cavity 12, 13 and quite intimately conformed to and sealingly complementary to the grooves 23 and 24. The sealing strip or tape 28 is then stripped from the mold and the components of the mold are then readily separable for removal of the molded articles such as sand cores therefrom, the seal 29 being carried integrally by the core box member 11. It will be observed that in addition to the undercut interlock of the seal 29 within the groove 24, a sprue stem 30 within the sprue hole 25 and vent stems 31 within the vent holes 27 extend from the seal and further assist in retaining the seal in place.

By virtue of the continuous, intimately conforming nature of the seal within the seal grooves in the joint surfaces 14 and 15, it operates not only as a seal but also to maintain accurate alignment of the mold components and thus relieves the guide pins 17 from strain and wear. Moreover, the seal 29 relieves the guide pins 17 from strains or shocks incident to mallet impacts against the mold components incident to effecting separation thereof for removal of the molded article.

Although the joint faces 14 and 15 in the exemplary embodiment of a mold shown in the drawing are not only parallel but planar, it will be appreciated, that the seal 29 can be just as effectively provided in the mating joint faces of a mold where the same are necessarily contoured or stepped to accommodate various article shapes to be molded.

It will be understood that modifications and variations may be effected without departing from the scope of the novel concepts of the present invention.

I claim as my invention:

1. In a method of sealing a sand molding box having separable sections defining molding cavity into which sand is adapted to be blown under strong compacting air pressure and provided with respective opposing separable-joint parting line faces with centering and alignment assuring means carried by one of said sections and projecting beyond the parting line face thereof spaced substantially from the cavity for extending into engagement with complementary means adjacent to the parting line face of the other section, the steps which comprise forming a groove in one of said faces about the cavity and between said alignment assuring and complementary means and the cavity and of a cross-sectional contour for receiving a sealing member in permanently affixed relation therein, forming a matching groove in the other face and of cross-sectional contour to preclude retention of a sealing member therein, putting into the grooves a moldable sealing material and with the box sections in face-to-face relation, with the centering means in engagement with said complementary means for maintaining the sections properly aligned so that said grooves together form a chamber across the parting line joint provided by said faces, molding said material into completely filling relation within said groove-defined chamber, setting the material into a permanent sealing member, incident to said setting permanently affixing the sealing member into said first mentioned groove, and freely releasably molding the sealing member into intimate matching relation into the second mentioned groove, so that the box sections can be freely separated and assembled with the sealing member remaining in said first mentioned groove during separation and during assembly complementally engaging in the second mentioned groove and providing in the groove chamber a barrier against escape of air and sand through the parting line face joint during the blowing of sand into the molding cavity for forming molded sand members.

2. The method defined in claim 1, further characterized in that the moldable sealing material comprises a low melting point metal alloy which is introduced into the groove-defined chamber in a molten state.

3. The method of claim 1 further characterized in that during the molding of the sealing material in the groove cavity there is applied about the outside of the separable sections and across the parting line face joint a self-sealing tape to prevent escape of the material, and the tape is stripped from the joint after molding has been completed.

4. In a sand molding box including separable sections defining a molding cavity, said sections having respective opposing separable-joint parting line faces, centering means carried by one of said sections and projecting from the parting line face thereof spaced substantially from the cavity, the parting line face of the other section having adjacent thereto complementary means with which the centering means engage for maintaining the sections in assembled alignment, one of said sections having a blow hole in the cavity through which sand is adapted to be blown under strong compacting air pressure, one of said parting line faces having a groove therein about the cavity and between the cavity and said centering and complementary means, a seal permanently affixed in said groove and directly molded thereinto and projecting beyond said one face, the other face having a matching groove to provide with the first mentioned groove a seal chamber and into which said seal projects in intimate groove-filling relation, and the seal being freely releasably separable from said other face groove so that said sections can be freely separated and assembled with the seal remaining in said first mentioned groove during separation, the seal during said assembled alignment of the sections providing in the groove chamber a barrier against escape of air and sand through the parting line face joint during blowing of sand into the cavity.

5. In a molding box as defined in claim 4, the seal being affixed to the section that has the blow hole so that such section can be attached to a sand blowing machine with the seal projecting downwardly from the parting face of such section.

References Cited in the file of this patent

UNITED STATES PATENTS

| | | |
|---|---|---|
| 1,180,352 | Werra | Apr. 25, 1916 |
| 2,209,882 | Galloway | July 30, 1940 |
| 2,510,417 | Rehklau | June 6, 1950 |
| 2,633,603 | Huse | Apr. 7, 1953 |
| 2,731,669 | Talalay | Jan. 24, 1956 |

FOREIGN PATENTS

| | | |
|---|---|---|
| 699,174 | Great Britain | Nov. 4, 1953 |
| 735,665 | Germany | May 21, 1943 |

OTHER REFERENCES

How To Select and Use Low-Melting Alloys as Production Aids, Seeds, "Materials and Methods," Sept., 1950, pages 64–68.